United States Patent
Cunningham et al.

(10) Patent No.: US 6,334,061 B1
(45) Date of Patent: Dec. 25, 2001

(54) INTEGRATED VEHICLE APPLIQUE UNIT FOR THE POSITION ENHANCED CELLULAR SYSTEM

(75) Inventors: Kenneth Cunningham, Sterling, VA (US); Leonard Schuchman, Potomac, MD (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 08/361,803

(22) Filed: Dec. 21, 1994

(51) Int. Cl.[7] .............................. H04B 1/38; H04M 1/00; G08G 1/123
(52) U.S. Cl. ................................ 455/553; 340/988
(58) Field of Search .................. 379/44, 56, 58, 379/59; 455/33.1, 56.1, 553; 340/426, 539, 993, 988; 330/151

(56) References Cited

U.S. PATENT DOCUMENTS

| | | | |
|---|---|---|---|
| 4,850,006 | * | 7/1989 | Sasaki et al. ................ 379/58 |
| 5,528,196 | * | 6/1996 | Baskin et al. ................ 330/151 |
| 5,555,286 | * | 9/1996 | Tendler ......................... 379/59 |

* cited by examiner

*Primary Examiner*—William Cumming
(74) *Attorney, Agent, or Firm*—Jim Zegeer

(57) ABSTRACT

A position enhanced cellular telephone system wherein a cellular telephone device incorporates an RF position finder facility, a data modem and controller and a car alarm device, having a system for flexibly merging the functionality of the telephone device, position finder facility, data modem, controller, and car alarm, reduce overall components and lower the cost. A microprocessor, with a memory, is provided with a plurality of data input and output terminals. Car alarm and position signals from said RF position finder facility to an input terminal on the microprocessor. A signal conversion circuit converts RF to baseband and vice versa, and electronic switch device controlled by the microprocessor for coupling RF signals to and from the cellular telephone device to the signal conversion circuit. A digital signal processor (DSP) coupled to said microprocessor and controlled thereby, said DSP being adapted to a microphone and a speaker connected to the DSP, and the DSP is coupled to the signal conversion circuit.

5 Claims, 2 Drawing Sheets

INTEGRATED VEHICLE APPLIQUE UNIT FOR THE POSITION ENHANCED CELLULAR SYSTEM

REFERENCE TO RELATED APPLICATIONS:

This application is related to the following: U.S. application Ser. No. 07/992,892, filed Dec. 17, 1992, U.S. application Ser. No. 08/079,810, filed Jun. 22, 1993, U.S. application Ser. No. 08/115,087, filed Sept. 2, 1993, and U.S. application Ser. No. 08/203,257, filed Mar. 1, 1994, all of which are incorporated herein by reference.

BACKGROUND AND BRIEF DESCRIPTION OF THE INVENTION:

The present invention integrates many elements of a Position Enhanced Cellular Telephone System (PECS) and user equipment (i.e., the vehicle applique unit VAU) into a single unit with improved performance characteristics and reduced unit cost. A VAU core includes GPS (or other broadcast) receiver circuitry for position location, a modem, a controller and an alarm interface. Additional cellular telephone interfaces for communicating via a cellular telephone channel are included.

The above referenced related applications disclose the position enhanced cellular telephone system (PECS). The objects of the present invention are to provide a PECS system, merge the cellular telephone and VAU core, accommodate both mobile and portable telephones, improve overall performance, and reduce and significantly lower unit cost.

Another object of the invention is to provide a system for enhancing the performance of a 0.6 Watt portable phone when used inside an automobile. This is achieved by use of a linear amplifier of appropriate gain and power level to compensate for RF losses, typically incurred by portables used in the automotive environment. Adjustments in power, as directed by the cellular network controller, are left to the portable telephone itself. The Integrated Unit, while described under the context of portable phones, is equally useful when applied as a part of a "mobile only" system.

Another object of the invention is provided by the architecture of the Integrated Unit which is transferable to forms of radio communication other than cellular telephone. For example, terrestrial/satellite based PCS, pagers, mobile radio and other emerging communication standards could be implemented with this architecture.

A further object of the invention is to provide additional RF switches inside the Integrated Unit for the purpose of selecting between dual cellular or GPS antennae.

A further object of the invention is to provide an integrated cellular transceiver VAU core which offers the following features: 1) voice-only operation, 2) data-in-voice operation, 3) data-only operation, 4) voice and message recording/playback, 5) interfaces to car alarms and vehicular data buses, and 6) enhanced portable phone performance.

Still a further object of the invention is to provide integrated cellular transceiver/VAU core units which can be used (without monthly billing) by leaving it in the "off" state until such time that a call is made to a service center. The call can be billed at a special roaming rate.

DESCRIPTION OF THE DRAWINGS:

The above and other objects, advantages and features of the invention will become more apparent when considered with the following specification and accompanying drawings wherein.

Figure 1:
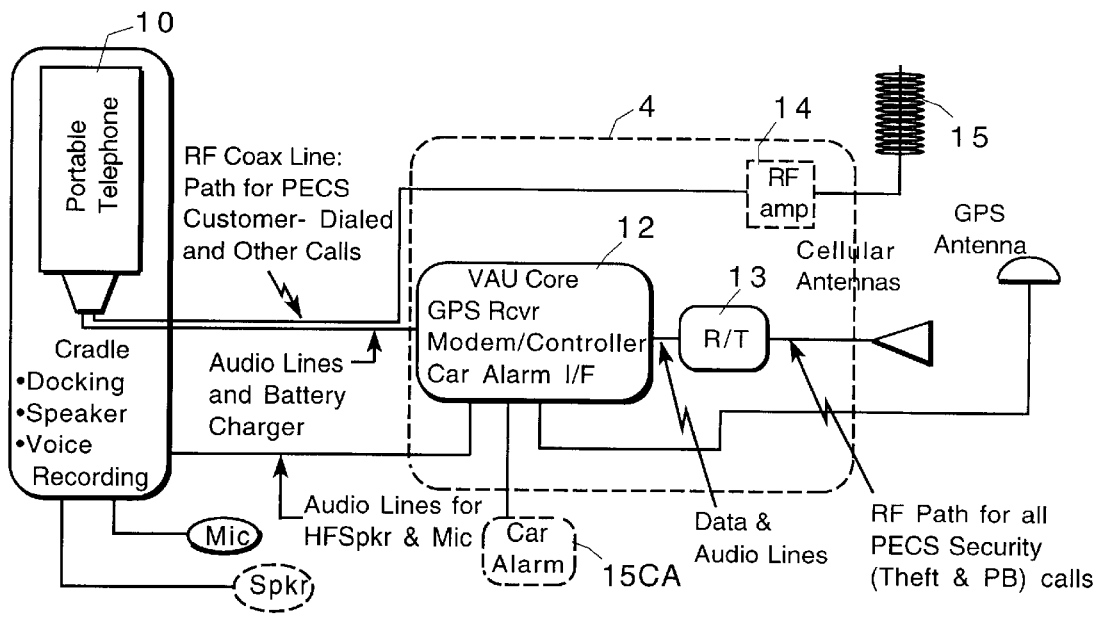
FIG. 1 is a block diagram of a PECS adaptor system for portable cellular telephones in vehicles.

DETAILED DESCRIPTION OF THE INVENTION:

The above reference to related applications discloses a new approach for providing PECS services to the user community. This approach enables users to employ their portable telephone as an integral part of the PECS in-vehicle equipment. FIG. 1 illustrates a PECS equipment group capable of using a portable phone 10 as the primary means of accessing PECS services. Note that FIG. 1 shows components as disclosed in the above-related application being used to compose the system. In particular, there is a set of elements in the dotted block 11 that are essential to PECS. These are the VAU Core 12, the Cellular Transceiver (R/T) 13, and an RF Amplifier 14.

The VAU Core 12 contains the circuitry and firmware necessary for providing the PECS overlay onto cellular telephone 10. The unit supports routine operation of the cellular telephone, car alarm 15, and other accessories under normal conditions but is capable of providing automatic control under select conditions. The VAU Core 12 has the following composition:

1) Baseband Audio Processor (Configurable for data-in-voice, data-only and voice-only operation).
2) Hands-free Audio Controller.
3) Core Microcontroller.
4) Power Supply.
5) Interfaces —cellular telephone, car alarm, automotive, antennae, etc.
6) GPS Receiver circuits.

The R/T 13 is equivalent to a mobile telephone transceiver. This device is compatible with regional phone service (e.g., FM (AMPS), TDMA, and/or CDMA in the U.S.). In general, the R/T 13 has the following composition:

1) RF Amplifiers.
2) Receive/Transmit RF Front End (includes gain control, tuning, filtering, etc.)
3) R/T Microcontroller.
4) Baseband Audio Processor.
5) Hands-free Audio Controller.
6) Power Supply.
7) Interfaces —cellular telephone, automotive, antenna, etc.

The RF Amplifier 14 provides a "boost" to RF signal strength (in both the transmit and receive directions). This is desired since operation of a portable phone in automobile is subject to signal attenuation resulting in degraded performance. By providing a simple linear "booster", it is possible to compensate for losses experienced in the automobile and achieve an RF signal strength at antenna 15 equal to that which would have been achieved by a path outside the automobile. The amplifier is composed of RF amplifiers, filters, isolators, power splitters, and switches.

Figure 2:
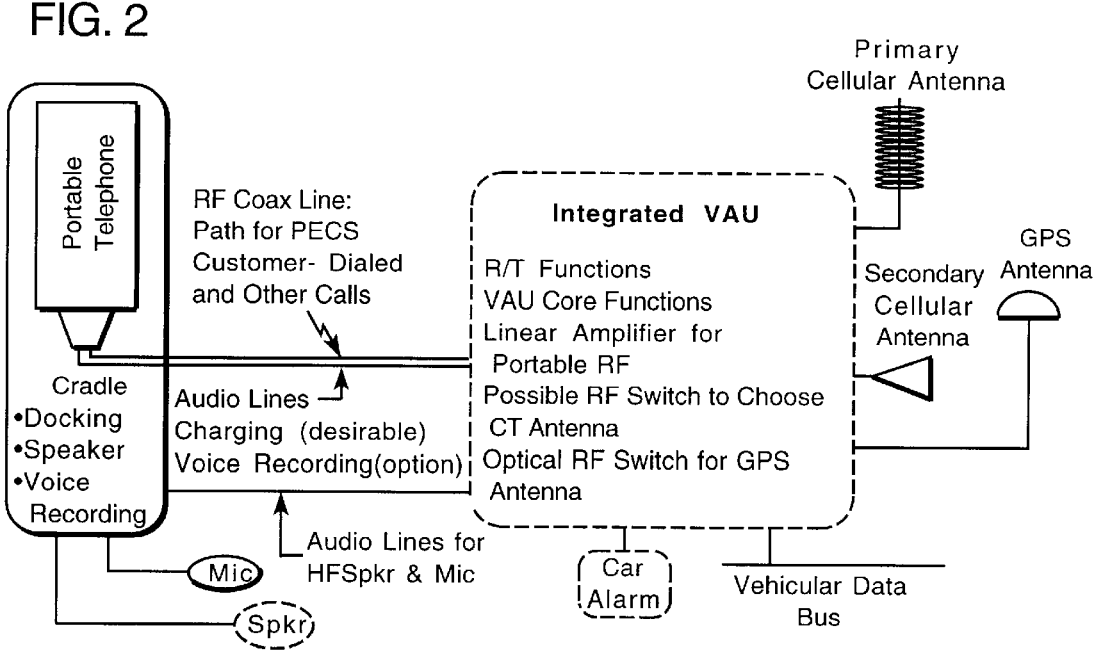
FIG. 2 is a block diagram of an integrated VAU/transceiver for portable and mobile cellular telephone devices.

When elements listed above are examined, it is possible to identify significant redundancy and overlap in their composition. For instance, the core 12 and the R/T 13 both require audio baseband processing, hands-free operation, general control and common interfaces. In a similar manner, the RF amplifier 14 overlaps the R/T. The invention provides an integrated unit that shares its resources while providing the functional equivalence of individual components. FIG. 2 depicts such a system.

Figure 3:
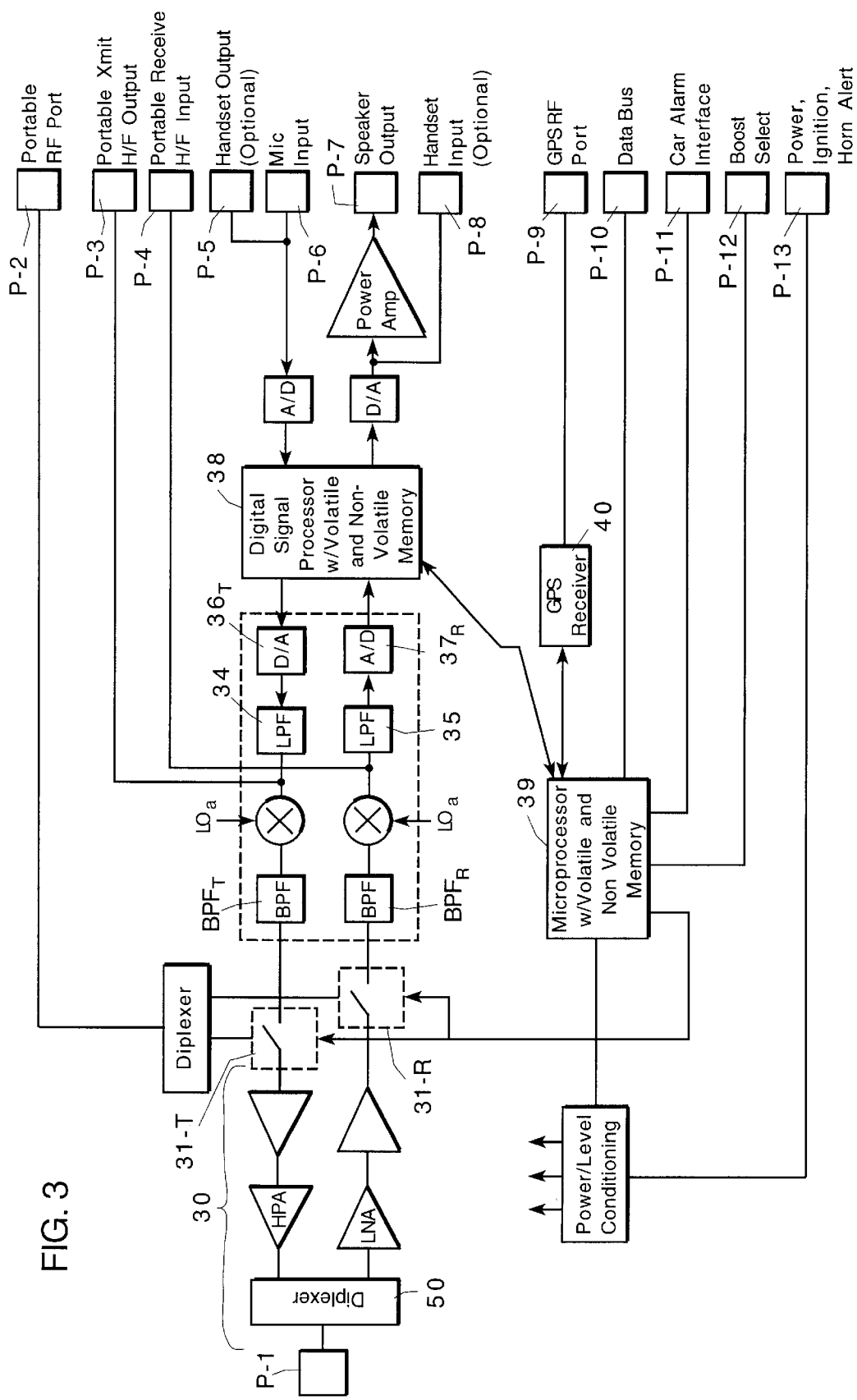
FIG. 3 is a more detailed block diagram of the integrated cellular transceiver/VAU core.

FIG. 3 is a block diagram for an integrated cellular RT/VAU Core. According to the invention, this device is capable of satisfying R/T, VAU Core and RF Amplifier requirements within a single unit. A common amplification stage 30 (from the RF Port to the Switches 31-T, 31-R) serves both the R/T and the portable booster. Note that the portable's amplification must be in the 0.6 Watt range while the R/T may be designed for either 0.6 or 3 Watt operation. Following the amplification stage 30 and transmit and receive switches 31-T and 31-R (controlled by microprocessor 39) comes signal conversion from RF to baseband (and vice versa). This conversion involves transmit and receive bandpass filtering BPFT and BPFR, respectively, tuning upconverter 32 which is connected to an oscillator LOT and downconverter 33 which is connected to local oscillator LORI filtering 34, 35, gain control (not shown), low pass filtering $34_T$ and 35, and digitization $36_T$ and $37_R$. Implementation of this circuitry may be achieved with conventional components or Charge-Coupled Device (CCD) technology. Furthermore, by making the CCD device and filters programmable, it is possible to serve multiple cellular modulation protocols (i.e., FM, TDMA, and/or CDMA).

A Digital Signal Processor (DSP) 38 serves as the baseband signal processor. This may be a programmable or fixed device with volatile and non-volatile memory. The DSP 38 performs several telephone and PECS functions including:

DTMF Generator/Detector

Volume Control

Filtering

Switching

Data Modem

Data-in-Voice Modem

Telephone Signal processing for digital protocols

Hands-free audio processing

Voice storage/playback

Overall control of the Integrated Unit is provided by the Microcontroller 39. This is a processor with volatile and non-volatile memory that directs telephone and VAU Core operation according to their prescribed protocols. This device interfaces/services the GPS receiver, car alarm and other external elements (e.g., phone handset, smart portable cradle, etc.) Microprocessor/controller 39 performs the following functions:

Telephone functions per established cellular telephone protocols

VAU functions

Interfaces:

Mobile handset

Car alarm

GPS

RF of portable

Cradle

Hands-free speaker and microphone

A plurality of input/output ports P-N are provided to allow a great degree of flexibility in user options as follows:

Port P1 is the RF port for coupling RF to and from an external antenna via diplexer 50.

Port P2 is the RF port for the portable telephone.

Port P3 is the portable transmit hands-free (H/F) output port.

Port P4 is the portable receiver hands-free input.

Port P5 is for an optional voice output from the optional handset (not shown) of the mobile R/T 13 shown in FIG. 1.

Port P6 is for coupling microphone input (FIG. 2).

Port P7 is for coupling to an output speaker (FIG. 2).

Port P8 is for an optional voice output to an optional handset (not shown).

Port P9 is for a connector to a GPS antenna (which may be hidden or concealed on a vehicle).

Port P10 is a data bus for inputting and outputting data to other terminal devices such as a display, recorder, etc., from microprocessor 39.

Port P11 is coupled to the car alarm 15 interface.

Port P12 is for inputting a boost select signal to boost the RF power by RF amplifier 14 for portable 10.

Port P13 can be used for a variety of power controlled devices such as ignition (to shut-off the ignition or activate the horn or other audible alarm, in case of theft).

The invention features the following:

1) An integrated unit that merges the functionality of an R/T, VAU core, and RF amplifier booster, reduces overall component count and dramatically lowers unit cost.

2) An approach for enhancing the performance of a 0.6 Watt portable phone in an automobile by compensating for RF losses experienced within the automobile. The approach uses a linear amplifier of appropriate gain and power level to compensate for losses. Adjustments in power, as directed by the cellular network controller, are left to the portable phone itself.

3) The integrated unit, while described under the context of portable phones, is equally useful when applied as a part of a "mobile only" system.

4) The architecture of the integrated unit is transferable to forms of communication other than cellular telephones. For example, terrestrial/satellite based PCS, pagers, mobile radio and other emerging communication standards could be implemented with this architecture.

5) Additional RF switches could be added inside the integrated unit for the purpose of selecting between dual cellular or GPS antennae.

6) The integrated unit offers the following features:

voice-only operation, data-in-voice operation, data-only operation, voice and message recording/playback, interface(s) to car alarms, and enhanced portable phone performance.

7) It is possible to use the integrated unit (without monthly billing) by leaving it in the "off" state until such time as a call is made to a service center. The cell will be billed at a special roaming rate.

While exemplary preferred embodiments of the invention have been described and illustrated, it will be appreciated that various other embodiments, adaptations, additions and modifications will be readily apparent to those skilled in the art without departing from the spirit and scope of the invention.

What is claimed is:

1. In a position enhanced cellular telephone system wherein a cellular telephone device incorporates a position finder facility, a data modem and controller and a car alarm device, the improvement for merging the functionality of said cellular telephone device, position finder facility, data modem, controller, and car alarm, the improvement comprising a function integrating unit, including:

a microprocessor and a plurality of data input and output terminals coupled to said microprocessor, means to couple position signals from said position finder facility to an input terminal on said microprocessor, means to couple signals from said car alarm to an input terminal of said microprocessor, a signal conversion circuit for converting cellular RF to baseband and baseband to cellular RF, and switch means controlled by said microprocessor for coupling cellular RF signals to and from said cellular telephone device to said signal conversion circuit, a digital signal processor (DSP) coupled to said microprocessor and controlled thereby, a microphone and a speaker connected to said DSP, and means coupling said DSP to said signal conversion circuit.

2. The position enhanced cellular telephone system defined claim 1 wherein said cellular telephone device includes a portable cellular RF telephone unit and a hands-free means for using said portable cellular RF telephone to be coupled to said signal conversion circuit at baseband level for processing thereby.

3. The position enhanced cellular telephone system defined in claim 2, including a linear RF amplifier to provide a power boost for said portable cellular RF in order to compensate for losses.

4. In a position enhanced cellular telephone system wherein a portable cellular telephone device incorporates an RF position finder facility, a data modem and controller and a car alarm device, the improvement for merging the functionality of said portable cellular telephone device, RF position finder facility, data modem, controller, and car alarm, the improvement comprising an integrating unit, comprising:

a microprocessor and a plurality of data input and output terminals coupled to said microprocessor, means to couple position signals from said RF position finder facility to an input terminal on said microprocessor, means to couple signals from said car alarm to an input terminal of said microprocessor, a signal conversion circuit for converting cellular RF signals to baseband and baseband to cellular RF, and switch means controlled by said microprocessor for coupling cellular RF signals to and from said cellular telephone device to said signal conversion circuit, a hands-free means for causing said portable cellular telephone to be coupled to said signal conversion circuit at baseband level for processing thereby, a digital signal processor (DSP) coupled to said microprocessor and controlled thereby, a microphone and a speaker connected to said DSP, and means coupling said DSP to said signal conversion circuit.

5. The position enhanced telephone system defined in claim 4, including a linear amplifier within the integrated unit to provide a power boost for said portable cellular RF telephone unit in order to compensate for losses.

* * * * *